June 3, 1941.   H. SAUER   2,244,505
FINDER FOR PHOTOGRAPHIC PURPOSES
Filed Sept. 10, 1938
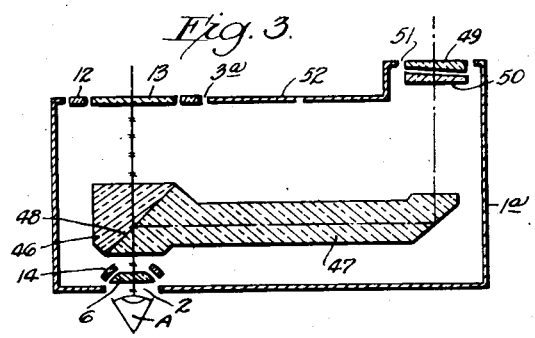
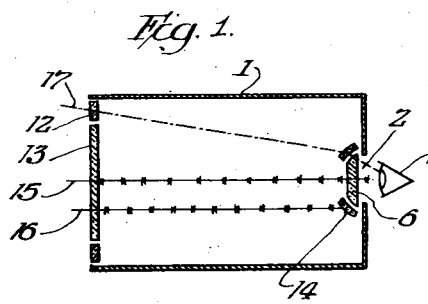 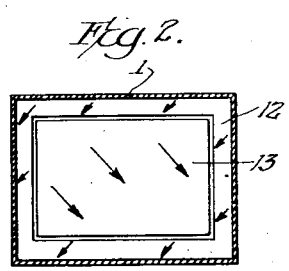
Inventor
Hans Sauer
By B. Singer & F. Stern
Attys.

Patented June 3, 1941

2,244,505

UNITED STATES PATENT OFFICE 2,244,505

FINDER FOR PHOTOGRAPHIC PURPOSES

Hans Sauer, Dresden, Germany, assignor to Zeiss Ikon Aktiengesellschaft, Dresden, Germany Application September 10, 1938, Serial No. 229,299
In Germany September 21, 1937

1 Claim. (Cl. 88—1.5)

The invention relates to improvements in finders for photographic purposes, and particularly is directed to finders which indicate correctly in advance that portion of the scene which will be projected by the camera objective on the negative. This desirable result can only be attained in a perfect manner when it is possible to observe distinctly together with the scene to be photographed certain marks indicating the boundary of the picture area.

The same result is obtained in finders for telescopes by producing a genuine picture of the scene in the plane in which the boundary marks are arranged.

In the well known collimation finders the mode of operation is the reverse, because a picture of the boundary marks, positioned practically at an indefinite distance, is reflected by means of semi-reflective and semi-transparent surfaces into the viewing field of the finder.

The semi-transparent mirror surface may have the shape of a concave mirror, as in the known Albada finder, which produces the boundary marks of the picture in a plane in which at the same time the scene to be photographed can be viewed sharply.

The first mentioned finders for telescopes have the disadvantage that the required number of optical elements is substantial and that these finders on account of their large size are not adapted to be installed in a camera, because the available space in a camera is limited. The principal disadvantage of the Albada finder is that the illumination of the picture boundary marks, which are arranged in rear of the semi-transparent surface, is insufficient, especially when the light is poor, as for instance when indoor pictures are to be made.

It is now the principal object of the present invention to provide a finder which overcomes the disadvantages of the finders heretofore employed by providing optical means for producing the picture boundary marks and a picture of the scene to be photographed in a single plane in such a manner that the finder shows clearly and distinctly that portion of the scene will appear on the negative.

Another object of the invention is to employ for the purpose of making the picture boundary marks better visible in the picture field of the finder certain means which differently influence geometric optically the light beams producing the picture of the boundary marks and the scene to be photographed respectively.

Still another object of the invention is to employ for the purpose of making the picture boundary marks better visible in the picture field of the finder certain means which differently influence the physical properties, for instance the plane of vibration of the light, of the light beams producing the picture of the boundary marks and the scene to be photographed respectively.

The present invention provides so to speak, a light switch having the effect that only the light rays emitted from the picture boundary marks pass through optical means serving to produce images of these boundary marks and then are conducted into the eye of the observer. It is immaterial, as far as the principle of the invention is concerned, how the optical means used for the reproduction of the picture boundary marks is formed.

The present invention may be employed in collimators in the form of a lens whose curved surface has a plane face ground thereon or is provided with a central bore, as for instance is disclosed in the German patent specification 387,251. The invention may also be employed in collimators in the form of a half-lens or the like, as disclosed by way of example in the German patent specification 350,186. In fact, the invention may be applied to numerous other finder arrangements.

Other objects of the invention will be apparent from the following description with reference to the drawings which illustrates diagrammatically and by way of example a few embodiments of the invention. It is desired to point out, however, that the invention is not at all limited to the disclosed embodiments as various other forms may be adopted within the scope of the claim.

In the drawings:

Figs. 1 and 2 illustrate in longitudinal section and end elevation respectively, a finder in which polarizing filters are employed.

Fig. 3 illustrates diagrammatically a finder of the present invention in combination with a base-range meter.

Referring to Fig. 1, the casing 1 of the finder is provided in its rear wall with an ocular opening 2 and in its front wall with a field opening in which the picture area indicating means are formed by polarizers used in the form of conventional foils. In the field opening of the finder casing 1 is mounted a polarizing filter 12 having the shape of a rectangular frame which forms the border of the picture. Within this frame a rectangular polarizing filter plate or foil 13 is arranged which covers the picture area of the finder. The polarizing planes of the filters 12 and 13 preferably are positioned at a right angle with respect to each other, but at any rate cross each other and are not parallel. At the ocular opening 2 of the finder a plano-convex lens 6 is arranged. In front of the annular convex surface of the lens 6 is mounted an annular polarizer 14, whose polarizing plane is parallel to the polarizing plane of the polarizer 12. The result of this arrangement is that a light ray 15 passing through the picture area is polarized by the polarizer 13, passes unobstructed through the biplanar center portion of the ocular lens 6 and reaches the eye A of the observer.

A light ray 16 which also passes through the polarizer 13, but strikes the annular polarizer 14, however, is absorbed owing to the crossed polarizing planes of the polarizers 13 and 14. Only light rays 17 which are polarized by the frame-like polarizer 12 and strike the annular polarizer 14, whose polarizing plane is parallel to that of polarizer 12, can pass through the polarizer 14. The light rays 17 are then directed by the convex portion of the ocular lens 6 into the eye A of observer and produce in this manner a bright border around the picture area in the finder.

Fig. 2 is an elevation view of the field aperture of the finder and illustrates the shape and arrangement of the two polarizing filters 12 and 13.

Since the finder arrangement of the present invention absorbs less light than a finder with semi-transparent reflective faces, the finder of the invention is particularly well adapted to be combined with the base range finder. The combination of such a picture finder with the range finder may be accomplished in such a manner that the ocular aperture of the picture finder forms at the same time the ocular aperture of the range finder.

Fig. 3 illustrates such a picture finder and range finder combination, in which the picture finder is constructed as shown in Figs. 1 and 2 and therefore similar parts of the same are provided with the same reference characters. It will be noted that one end of the mirror base 46, 47 of the range finder—namely the one provided with the angularly positioned semi-transparent reflecting face 48—is arranged between the polarizers 12, 13 and the ocular lens 6 of the picture finder. The optical members for deflecting the measuring rays of the range finder are designated with 49 and 50 and are arranged in an opening 51 of the front wall 52 of the casing 1ª. The front wall 52 is also provided with the field opening 3ª in which the polarizers 12 and 13 of the picture finder are mounted. Since range finders of this type and their operation are well known a more detailed description is believed not necessary.

The boundary or border marks appearing in the finder may also be used for determining the center of the picture or any other desired points of the object to be photographed. It is for instance possible to employ the finder of the present invention to advantage in target practicing devices for aerial cameras and the like.

What I claim as my invention is:

A finder for photographic purposes, including a casing provided at one end with a field opening and at the other end with an ocular opening, light polarizing means closing said field opening and comprising two polarizing foils mounted in the same plane with their polarizing planes at a right angle to each other, one of said polarizing foils forming the picture area of said finder and the other a picture boundary frame surrounding said picture area, a plano-convex ocular lens at said ocular opening, the center portion of said ocular lens being biplanar for permitting an observation of the picture appearing in the picture area in natural size, and an annular polarizing filter in front of the marginal convex face of said ocular lens, the polarizing plane of said annular polarizing filter being parallel with respect to the polarizing plane of the filter forming the picture boundary frame.

HANS SAUER.